(12) United States Patent
Peled et al.

(10) Patent No.: US 11,278,385 B2
(45) Date of Patent: Mar. 22, 2022

(54) TOOTHBRUSH CONFORMING TO DENTAL ARCH AND CORRESPONDING DEVICES AND METHODS

(71) Applicant: DENTVER LTD., Kfar Saba (IL)

(72) Inventors: Bar Yaad Peled, Gilon (IL); Eran Eyal, Kfar Saba (IL)

(73) Assignee: DENTVER LTD., Kfar Saba (IL)

( * ) Notice: Subject to any disclaimer, the term of this patent is extended or adjusted under 35 U.S.C. 154(b) by 277 days.

(21) Appl. No.: 16/607,817

(22) PCT Filed: Apr. 24, 2018

(86) PCT No.: PCT/IL2018/050450
§ 371 (c)(1),
(2) Date: Oct. 24, 2019

(87) PCT Pub. No.: WO2018/198116
PCT Pub. Date: Nov. 1, 2018

(65) Prior Publication Data
US 2020/0179091 A1 Jun. 11, 2020

Related U.S. Application Data

(60) Provisional application No. 62/489,483, filed on Apr. 25, 2017.

(51) Int. Cl.
*A61C 17/22* (2006.01)
*A46B 5/00* (2006.01)
(Continued)

(52) U.S. Cl.
CPC .......... *A61C 17/228* (2013.01); *A46B 5/0025* (2013.01); *A46B 7/06* (2013.01);
(Continued)

(58) Field of Classification Search
CPC ....... A61C 17/22; A61C 17/228; A61C 17/26; A61C 17/32; A61C 17/34; A61C 17/349;
(Continued)

(56) References Cited

U.S. PATENT DOCUMENTS 8,020,464 B2 * 9/2011 Jiang ........................ F16H 55/08
74/462
8,272,284 B2 * 9/2012 Tateishi .............. F16H 25/2015
74/89.37

(Continued)

*Primary Examiner* — Shay Karls
(74) *Attorney, Agent, or Firm* — Mark M. Friedman

(57) ABSTRACT

A toothbrush (10) includes a brush assembly (16) with at least three bristle arrangements (12), each having opposing inwardly-directed bristles (122, 124, 126) for simultaneously contacting facial and lingual surfaces (52, 54), and preferably also occlusal surfaces (56) of the teeth (50). Flexible linkages (14), interconnecting the bristle arrangements (12), maintain a relative spacing between the bristle arrangements (12) while allowing variation of an effective curvature of the brush assembly (16) such that the bristle arrangements (12) can ride along, and conform to a non-uniform curvature of, the arch of teeth. The toothbrush (IO) preferably also includes an actuation mechanism (22) for generating to-and-fro motion of the brush assembly (16) along the arch of teeth, most preferably combined with a more rapid small-amplitude oscillatory motion.

17 Claims, 12 Drawing Sheets

(51) Int. Cl.
  *A46B 7/06* (2006.01)
  *A46B 9/02* (2006.01)
  *A46B 9/04* (2006.01)
  *A46B 13/02* (2006.01)
  *A61C 17/34* (2006.01)

(52) U.S. Cl.
  CPC .............. *A46B 9/025* (2013.01); *A46B 9/045* (2013.01); *A46B 13/023* (2013.01); *A61C 17/349* (2013.01); *A61C 17/3472* (2013.01)

(58) Field of Classification Search
  CPC ....... A46B 9/026; A46B 9/045; A46B 5/0025; A46B 7/06
  See application file for complete search history.

(56) References Cited

U.S. PATENT DOCUMENTS

| | | | |
|---|---|---|---|
| 8,990,992 B2* | 3/2015 | Stapelbroek | A61C 17/228 15/22.1 |
| 9,308,065 B2* | 4/2016 | Steiner | A61C 17/3445 |
| 9,357,835 B2* | 6/2016 | Krasnick | A46B 5/0066 |
| 2001/0004171 A1* | 6/2001 | Griswold | H02K 41/0356 310/30 |
| 2017/0100223 A1* | 4/2017 | Silverberg | A61C 17/222 |
| 2020/0138180 A1* | 5/2020 | Arbeitman | A61C 17/228 |

\* cited by examiner

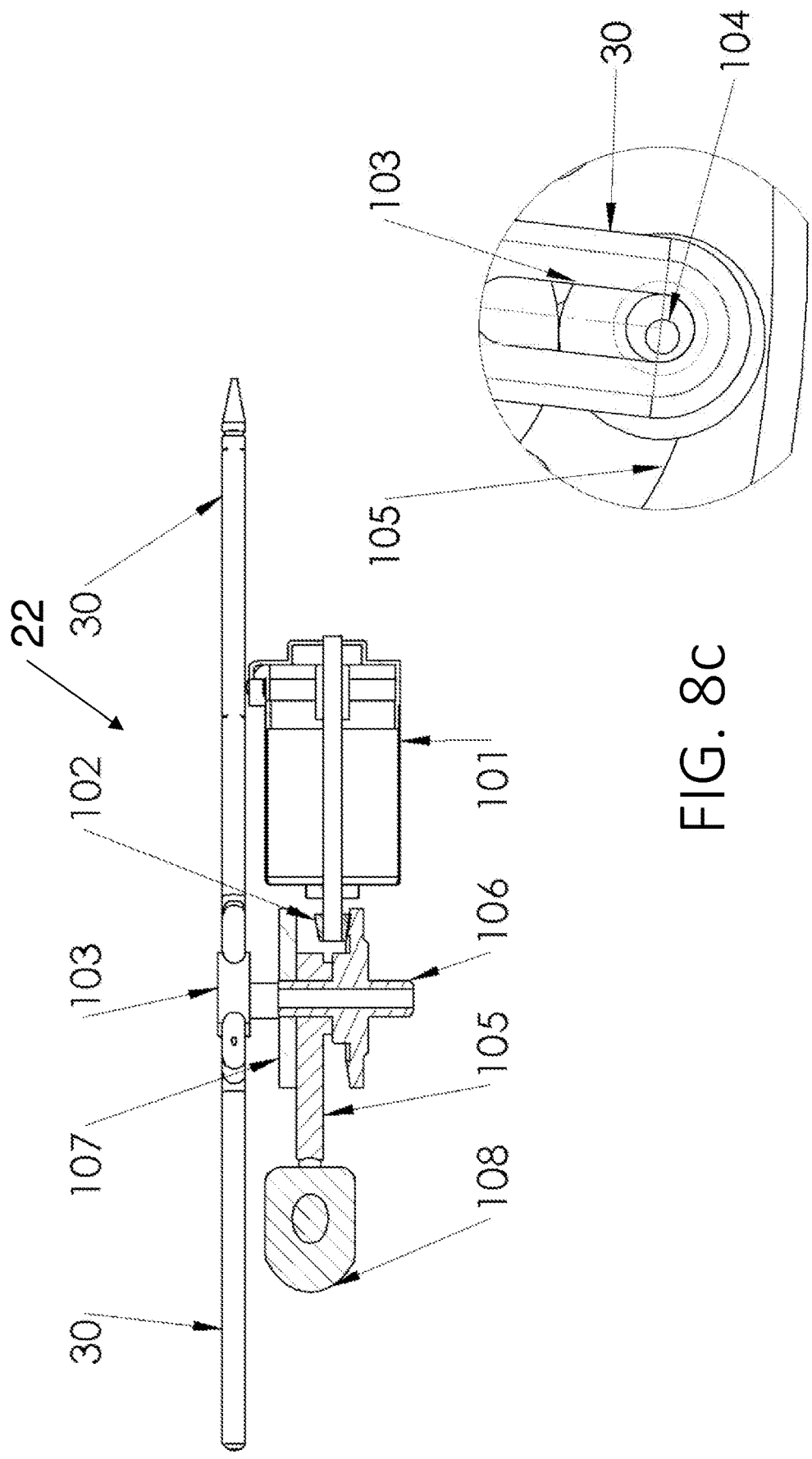

TOOTHBRUSH CONFORMING TO DENTAL ARCH AND CORRESPONDING DEVICES AND METHODS

FIELD AND BACKGROUND OF THE INVENTION

The present invention relates to toothbrushes and, in particular, it concerns a toothbrush conforming to a dental arch and corresponding devices and methods.

Oral hygiene is important for mitigating dental decay and for the prevention of systemic diseases, such as cardiovascular diseases, diabetes or osteoporosis which can be linked to poor oral hygiene. Brushing ones teeth regularly and efficiently is a key operation for maintaining good oral hygiene. Optimally, all dental surfaces should be cleaned with an appropriate applied force and at an appropriate rate, but this requires considerable care and ability, and it is not uncommon that people fail to clean all dental surfaces and the gingivae effectively. It would therefore be advantageous to provide a toothbrush which would render the brushing process guided to achieve a more controlled and uniform brushing motion and, in some cases, perform brushing automatically.

It is known to provide toothbrushes which surround multiple faces of a tooth and/or which extend around a significant proportion of a dental arch. Such a device would require personalized fitting to the curvature of an individual's dental arch, and cannot perform a significant brushing action along the length of the dental arch due to variations in curvature encountered along the dental arch.

SUMMARY OF THE INVENTION

The present invention is a toothbrush and corresponding devices and methods.

According to the teachings of an embodiment of the present invention there is provided, a toothbrush for brushing at least one arch of teeth in a mouth of a user, the toothbrush comprising a brush assembly for introducing into the mouth of the user, the brush assembly comprising: (a) at least three bristle arrangements, each of the bristle arrangements including a plurality of opposing inwardly-directed bristles for simultaneously contacting facial and lingual surfaces of the teeth; and (b) flexible linkages interconnecting the at least three bristle arrangements, the flexible linkages being configured to maintain a relative spacing between the bristle arrangements while allowing variation of an effective curvature of the brush assembly such that the at least three bristle arrangements can ride along, and conform to a non-uniform curvature of, the arch of teeth.

According to a further feature of an embodiment of the present invention, there is also provided an actuation mechanism mechanically linked to the brush assembly and configured to displace the brush assembly in a to-and-fro motion along the arch of teeth.

According to a further feature of an embodiment of the present invention, the actuation mechanism is configured to displace the brush assembly in a compound motion comprising the to-and-fro motion with a first amplitude and a first frequency and an oscillatory component with a second amplitude smaller than the first amplitude and a second frequency higher than the first frequency.

According to a further feature of an embodiment of the present invention, the second frequency of the oscillatory motion is at least an order of magnitude higher than the first frequency of the to-and-fro motion.

According to a further feature of an embodiment of the present invention, the brush assembly includes at least one gap between adjacent bristle arrangements, and wherein the first amplitude of the to-and-fro motion is larger than a length of the at least one gap.

According to a further feature of an embodiment of the present invention, the actuation mechanism is configured to remain outside the mouth of the user, the actuation mechanism being linked to two contralateral regions of the brush assembly via a pair of rods, the actuation mechanism being configured to impart motion to the brush assembly via the rods.

According to a further feature of an embodiment of the present invention, the actuation mechanism comprises an electric actuator.

According to a further feature of an embodiment of the present invention, the actuation mechanism comprises a pneumatic actuator.

According to a further feature of an embodiment of the present invention, the actuation mechanism comprises a hydraulic actuator.

According to a further feature of an embodiment of the present invention, each of the bristle arrangements comprise a plurality of bristles projecting from at least one bristle support element, and wherein the bristle support elements and the flexible linkages are integrally formed from a flexible polymer material.

According to a further feature of an embodiment of the present invention, at least one of the bristle arrangements further includes bristles inwardly directed for contacting occlusal surfaces of the teeth.

According to a further feature of an embodiment of the present invention, the brush assembly has a length sized to extend along a majority of a length of the arch of teeth.

According to a further feature of an embodiment of the present invention, the at least three bristle arrangements are implemented as a plurality of bristle arrangements deployed such that bristles contact the teeth along a contact profile spanning a majority of a length of the brush assembly.

According to a further feature of an embodiment of the present invention, the bristle arrangements include bristles deployed for simultaneously contacting facial and lingual surfaces of the teeth of both a maxillary arch and a mandibular arch.

There is also provided according to an embodiment of the present invention, a method for brushing at least one arch of teeth in a mouth of a user, the method comprising the steps of: (a) positioning the aforementioned toothbrush on the arch of teeth so that bristles of each of the bristle arrangements contact facial and lingual surfaces of the teeth; and (b) displacing the toothbrush so that each of the bristle arrangements rides along a corresponding portion of the arch of teeth.

According to a further feature of an embodiment of the present invention, a rapid oscillatory motion of the toothbrush is generated during the displacing.

There is also provided according to an embodiment of the present invention, an automatic toothbrush for brushing at least one arch of teeth in a mouth of a user, the automatic toothbrush comprising: (a) a brush assembly for introducing into the mouth of the user, the brush assembly comprising: (i) at least three bristle arrangements, each of the bristle arrangements including a plurality of opposing inwardly-directed bristles for simultaneously contacting facial and lingual surfaces of the teeth, and (ii) flexible linkages interconnecting the at least three bristle arrangements, the flexible linkages being configured to maintain a relative spacing between the bristle arrangements while allowing variation of an effective curvature of the brush assembly such that the at least three bristle arrangements can ride along, and conform to a non-uniform curvature of, the arch of teeth; and (b) an actuation mechanism mechanically linked to the brush assembly and configured to displace the brush assembly in a compound motion comprising a first component performing a to-and-fro motion along the arch of teeth with a first amplitude and a first frequency and a second component performing an oscillatory motion with a second amplitude smaller than the first amplitude and a second frequency higher than the first frequency.

BRIEF DESCRIPTION OF THE DRAWINGS

The invention is herein described, by way of example only, with reference to the accompanying drawings, wherein:

FIG. 8b is a cross-sectional view taken along the line A-A of FIG. 8a; and

FIG. 8c is an enlarged view of the region of FIG. 8a designated B.

DESCRIPTION OF THE PREFERRED EMBODIMENTS

Figure 1:
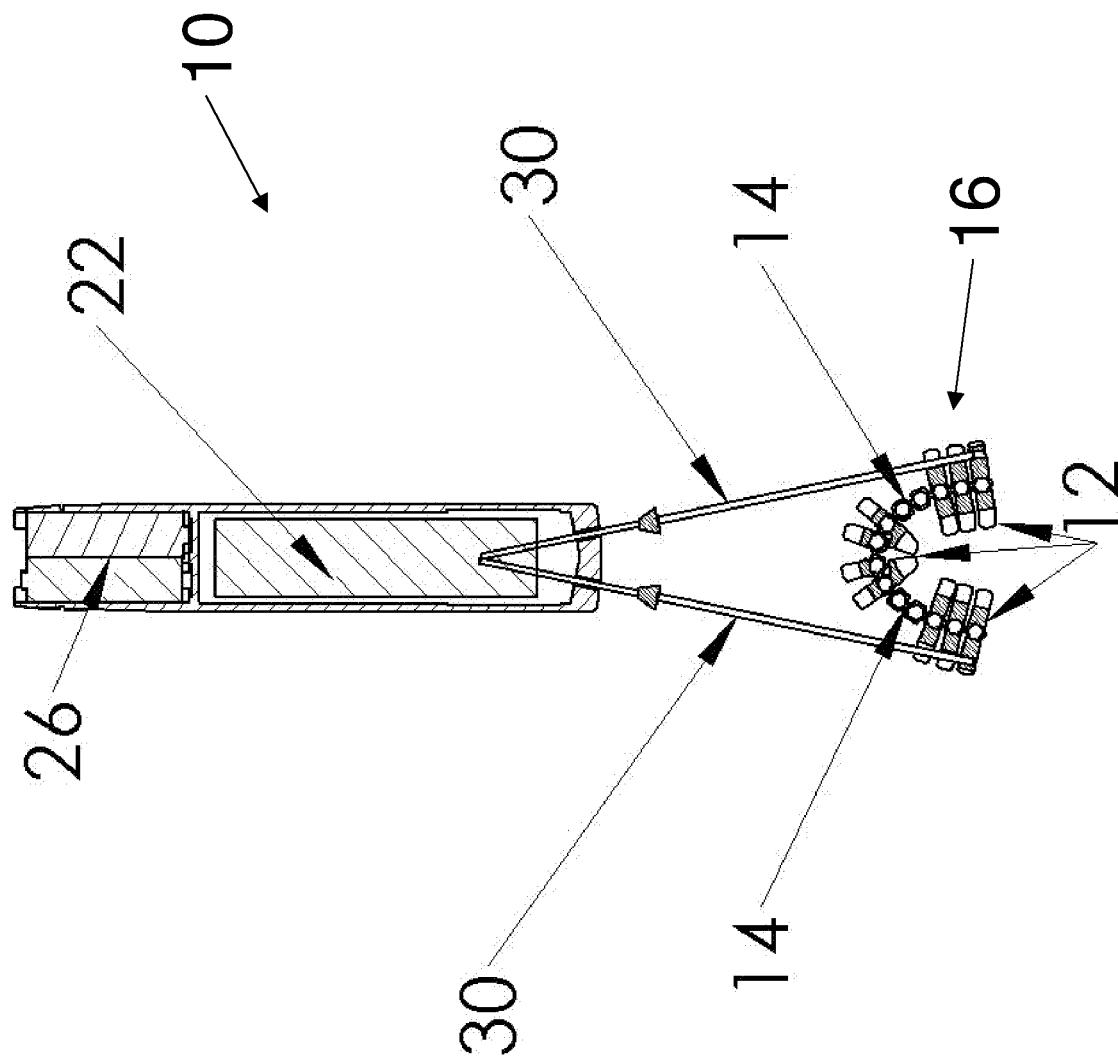
FIG. 1 is a schematic top view of a toothbrush device according to an embodiment of the present invention.

The present invention is a toothbrush conforming to a dental arch and corresponding devices and methods.

The principles and operation of a toothbrush according to an embodiment of the present invention may be better understood with reference to the drawings and the accompanying description.

Referring now to the drawings, FIGS. 1-8b illustrate various aspects of a toothbrush, generally designated 10, for brushing at least one arch of teeth in a mouth of a user. In general terms, toothbrush 10 includes a brush assembly 16 for introducing into the mouth of the user. Brush assembly includes at least three bristle arrangements 12, each having a plurality of opposing inwardly-directed bristles 122, 124, 126 (FIGS. 2a and 2b) for simultaneously contacting facial and lingual surfaces 52, 54 of the teeth 50, and preferably also occlusal surfaces 56 of the teeth. Flexible linkages 14, interconnecting the bristle arrangements 12, are configured to maintain a relative spacing between bristle arrangements 12 while allowing variation of an effective curvature of brush assembly 16 such that the bristle arrangements 12 can ride along, and conform to a non-uniform curvature of, the arch of teeth.

Figure 5A:
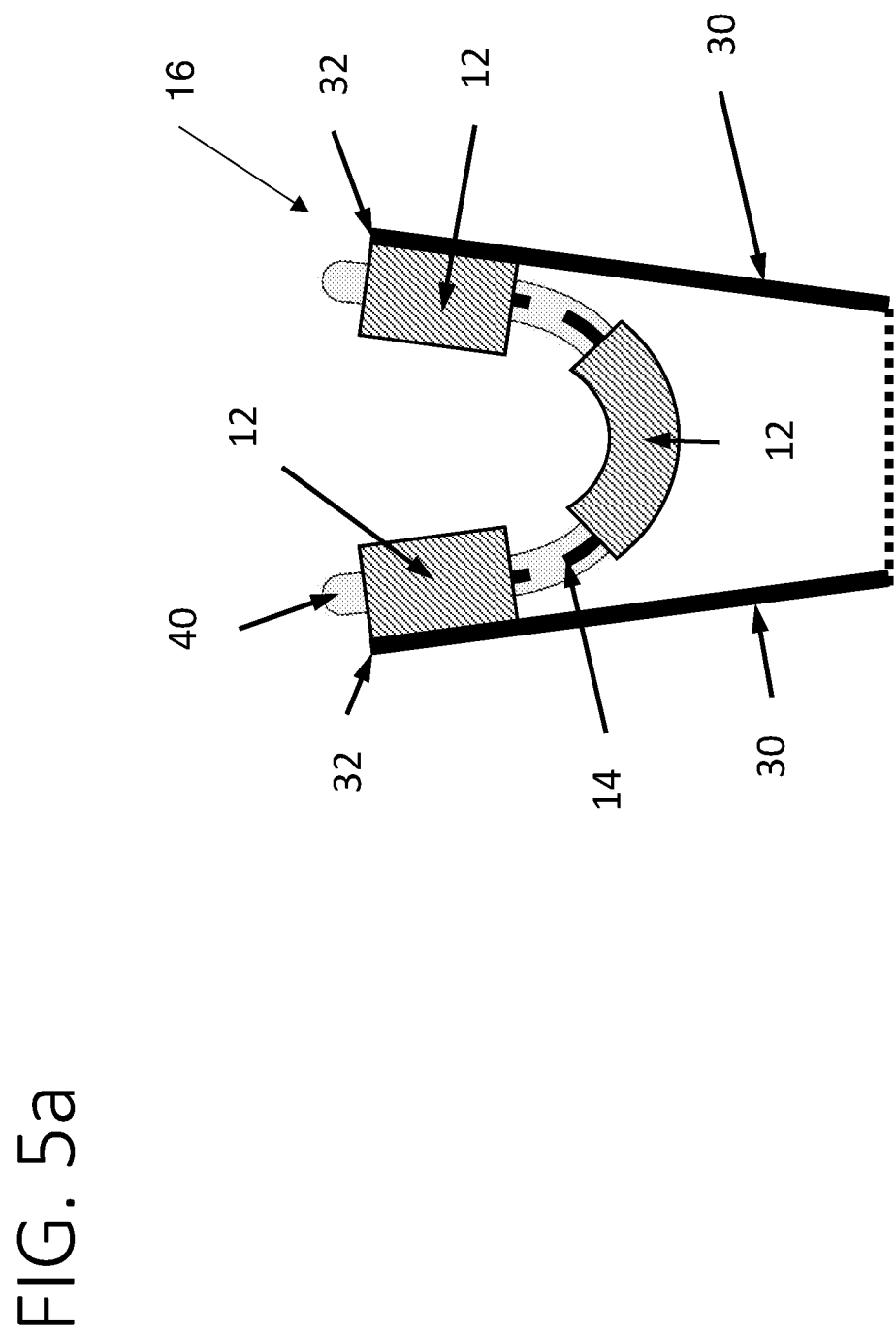
FIGS. 5a-5c are schematic plan views illustrating the motion of bristle arrangements along an arch of teeth according to the teachings of an aspect of the present invention, the bristle arrangements being shown in a center position, a right-displaced position and a left-displaced position, respectively.
Figure 5B:
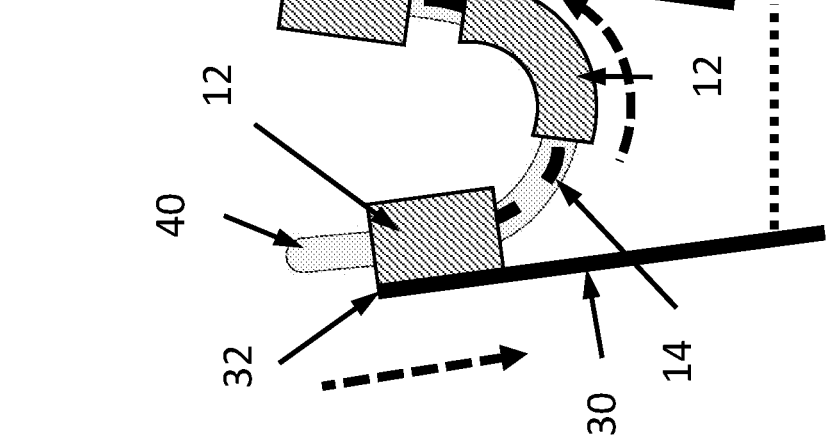
Figure 5C:
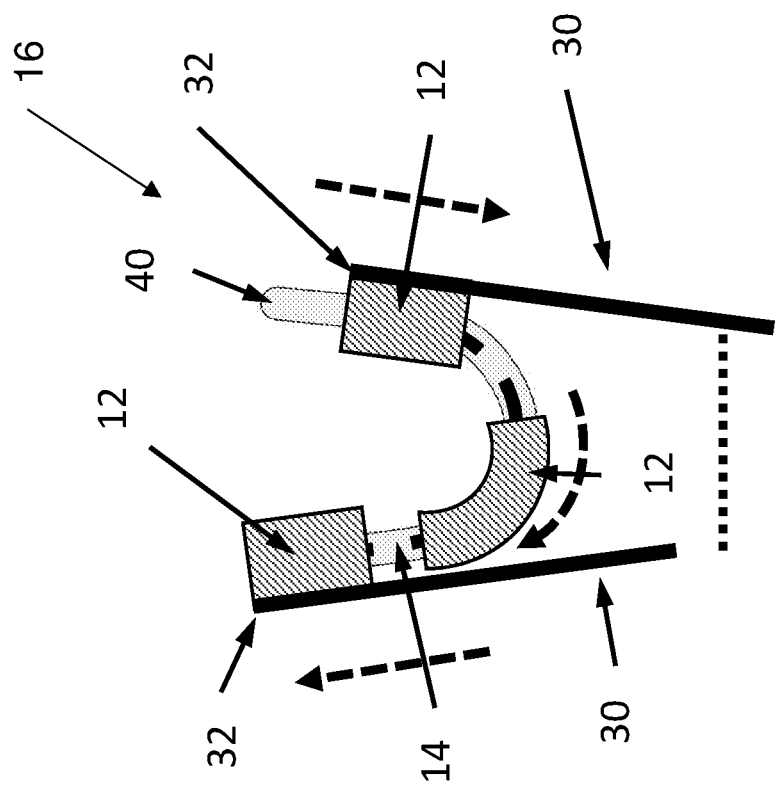

It will be immediately apparent that this toothbrush structure provides significant advantages. By providing a plurality of bristle arrangements spread around the arch of the teeth, thorough brushing of the teeth may be performed quickly and efficiently by a to-and-fro motion along the teeth. By employing flexible linkages between the bristle arrangements, the brush assembly can conform to the varying curvature of the arch of teeth, effectively traveling along the arch of teeth using the teeth as a "monorail" which defines the local curvature of the brush assembly, thereby tending to maintain effective contact of the bristles with all surfaces of the teeth along the entire contact profile of the brush assembly. The functionality of the brush assembly during use is best understood with reference to FIGS. 5a-5c, where the arch of teeth is schematically represented by profile 40 on which three bristle arrangements 12 ride, interconnected by flexible linkages 14. Contralateral regions of the brush assembly 16 are attached to respective actuator rods 30 at connections 32, which may be rigid or pivotal connections. Starting in an initial symmetric position as shown in FIG. 5a, the actuator rods 30 may be displaced in opposite directions, one anteriorly and one posteriorly, in alternating antiphase reciprocating motion to cycle through the positions of FIGS. 5a-5b-5a-5c-5a, thereby providing a to-and-fro motion of each bristle arrangement 12 along a respective section of the arch of teeth. A dotted line denotes the neutral position of the ends of rods 30 corresponding to the center position of the brush assembly.

In one implementation, the toothbrush may be operated by manual displacement of rods 30. In other particularly preferred implementations, toothbrush 10 further includes an actuation mechanism 22 mechanically linked to brush assembly 16 and configured to displace the brush assembly in a to-and-fro motion along the arch of teeth. The actuation mechanism 22 can be mounted in any suitable location where it can convey forces to the brush assembly to induce the desired motion, including an intraoral location. More preferably, actuation mechanism 22 may advantageously be integrated with a handset or handle 20 which remains outside the mouth of the user during operation. In this case, the actuation mechanism is advantageously linked to two contralateral regions of brush assembly 16 via pair of rods 30, and is configured to impart motion to brush assembly 16 via bidirectional forced conveyed along rods 30. The to-and-fro motion generated by actuation mechanism 22 may be generated by any suitable mechanism based on any suitable source of power including, but not limited to, manual operation (such as by squeezing and releasing an actuation lever), an electric actuator powered by one or more included battery 26 (FIG. 1) and/or an external electrical power source, pneumatic actuation such as from a pressurized gas cartridge driving a pneumatic actuator, or by hydraulic power such as a mechanism driven by water flow or static pressure from a water faucet (referred to collectively as a "hydraulic actuator"). The term "actuator" is used herein broadly to refer to any device for converting potential energy into motion, and includes linear and rotary actuators and motors of all sorts.

The to-and-fro travel of the brush assembly is typically relatively slow, typically with a period of at least 1 second (i.e., a frequency of below 1 Hz), as determined by user preference and/or by the force and power limitations of actuator system 22. The amplitude of the motion is chosen to be greater than the largest gap between adjacent bristle arrangements 12 so that all regions of the teeth between adjacent bristle arrangements are passed across by the movement of the bristles. Additionally, the range of motion preferably complements the overall span of the brush assembly along the arch of teeth so that, at the extremities of the range of motion, the ends of the brush assembly reach all surfaces of the last teeth in the arch of teeth. To this end, brush assembly 16 is preferably of a length sized to extend along a majority of a length of the arch of teeth. To accommodate dental arches of differing sizes, both for a single individual between the mandibular and maxillary arches and between different individuals, a range of different sizes of brush assemblies are preferably provided, typically ranging from about 6 cm length up to about 14 cm as measured along the center line of the curved form, which may be offered as Small, Medium, Large and Extra-Large sizes and/or child, youth and adult models, which may also vary in height/depth to accommodate different sizes of teeth. The amplitude of the to-and-fro motion of the blush assembly is typically at least about 1 cm, and most preferably in the range of 2-4 cm (i.e., 1-2 cm in each direction from the symmetrical or "center" position). Optionally, the amplitude of to-and-fro motion may be adjustable by the user.

Figure 6A:
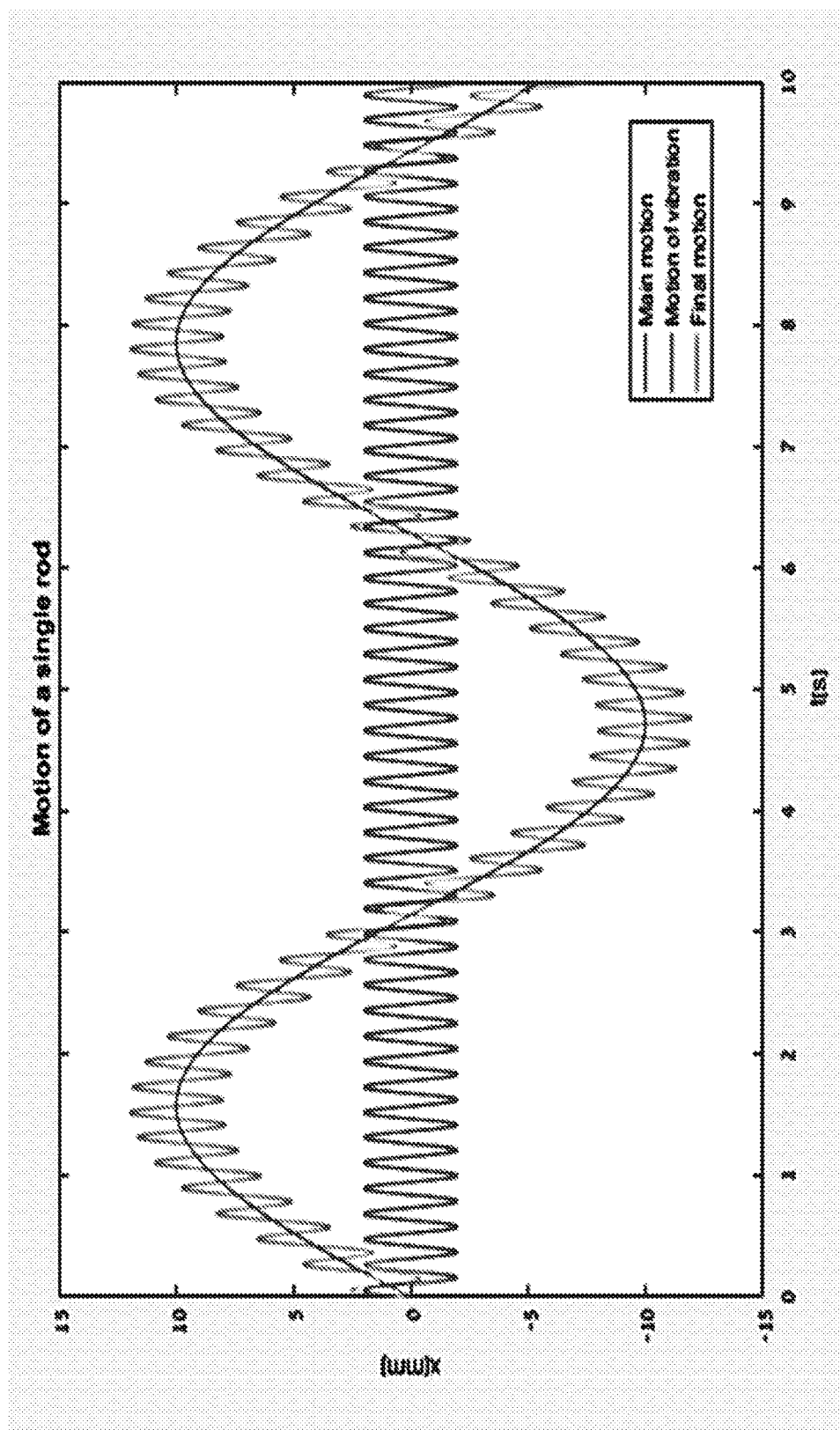
FIG. 6a is a graph representing two components of an actuation mechanism displacement as a function of time to generate a combination motion of the brush assembly according to a non-limiting exemplary implementation of the present invention.
Figure 6B:
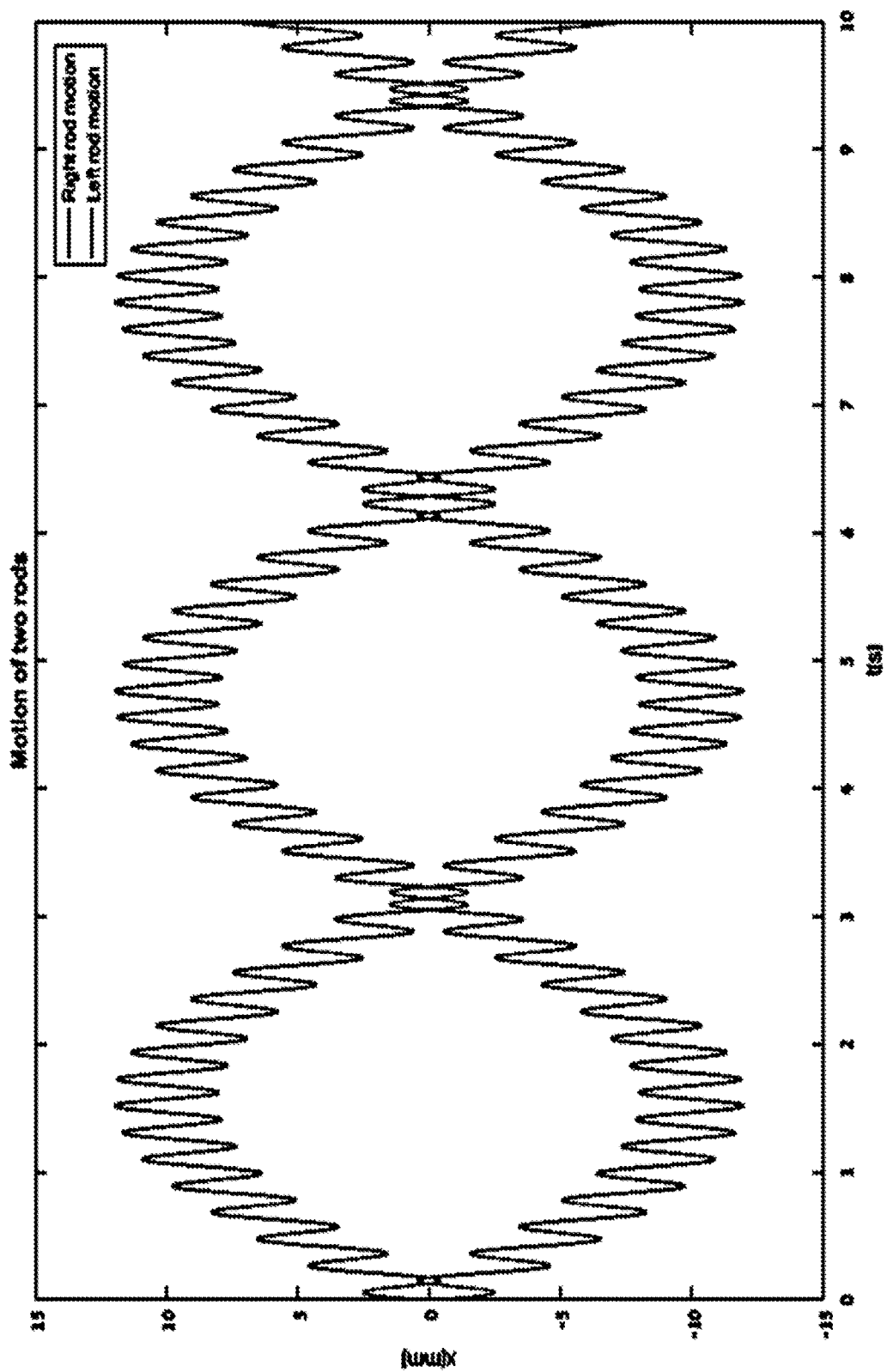
FIG. 6b is a graph similar to FIG. 6a illustrating the overall motion generated in two actuator rods for generating motion of the brush assembly according to a non-limiting exemplary implementation of the present invention.
Figure 7:
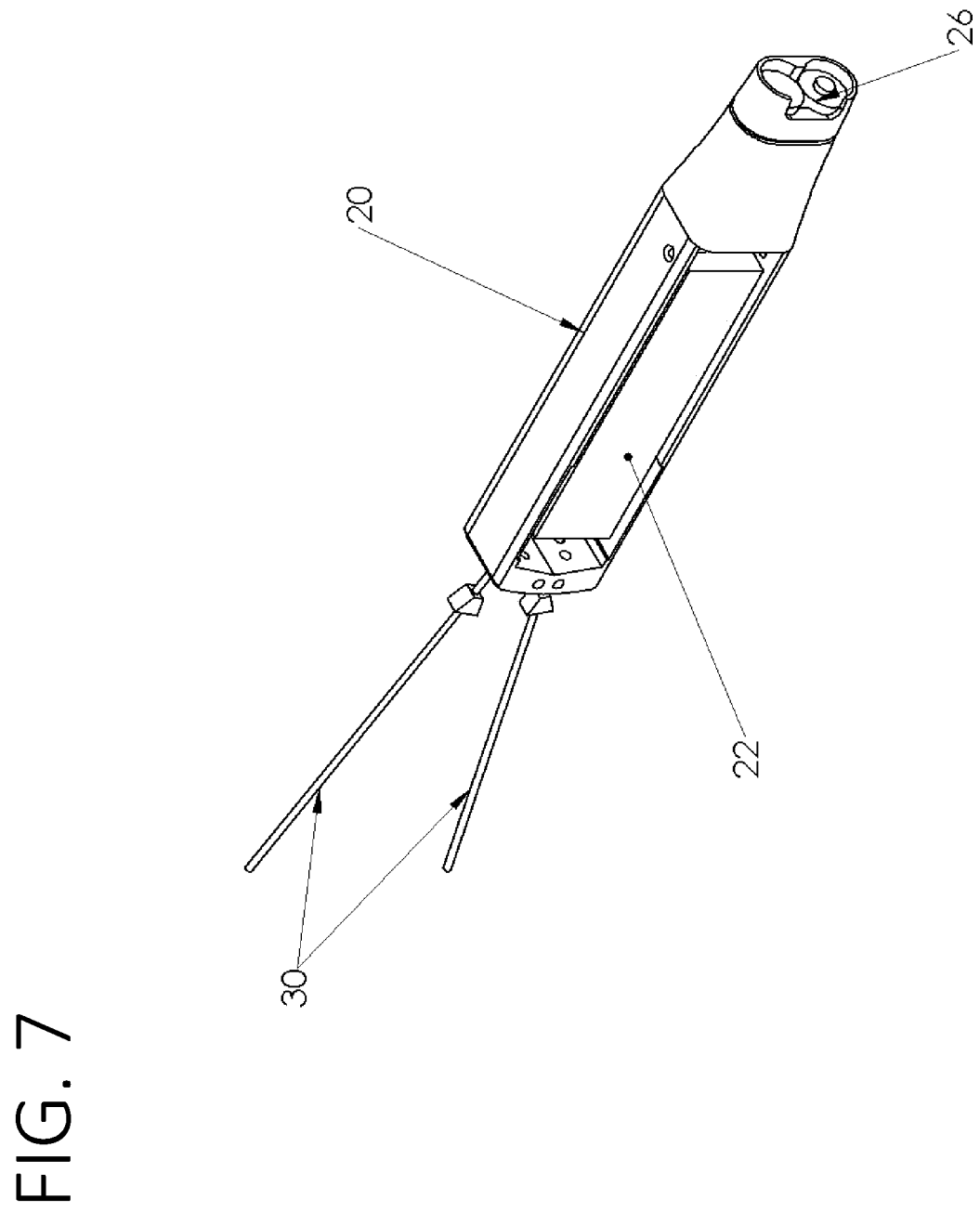
FIG. 7 is a schematic isometric view of an exemplary implementation of an actuation mechanism for the device of FIG. 1.

In various particularly preferred implementations of the present invention, actuation mechanism 22 is configured to displace brush assembly 16 in a rapid oscillatory motion with an amplitude smaller than the to-and-fro motion and a frequency higher than the to-and-fro motion, preferably by an order of magnitude. The oscillatory motion preferably has a frequency in excess of 10 Hz, and is typically in the range of 50-150 Hz, with an amplitude preferably less than 5 mm, and typically in the range of 0.5-3 mm. This rapid oscillatory motion is particularly effective for removal of dental plaque. The oscillatory motion is preferably superimposed on the to-and-fro motion to generate a compound motion. This is illustrated in FIG. 6a, where there are shown a smooth sinusoidal wave representing the low frequency larger-amplitude to-and-fro motion component, a rapid small-amplitude oscillating motion component, and the overall compound motion in which the larger amplitude motion is modulated by the rapid oscillation. FIG. 6b illustrates the synchronous motion of the two rods 30 according to a particularly preferred implementation in which the motion for one rod is in exact antiphase with (i.e., equal and opposite to) the other. It should be noted however that, particularly for high frequency small amplitude motions, it may be acceptable to apply the rapid oscillation in-phase (i.e., simultaneously in the same direction) or at any other desired phase difference, since the small range of motion is accommodated by the flexing/rubbing motion of the bristles which this motion is intended to induce.

It will be noted that the two components of the motion may be generated either by independent actuators or by a single actuator configured to generate the compound motion output. Where different actuators are used, the actuators may be of differing types, and may be actuated by different power sources, for example, with the to-and-fro motion being powered manually and the rapid oscillation being generated by an electrically powered vibrator.

Figure 8A:
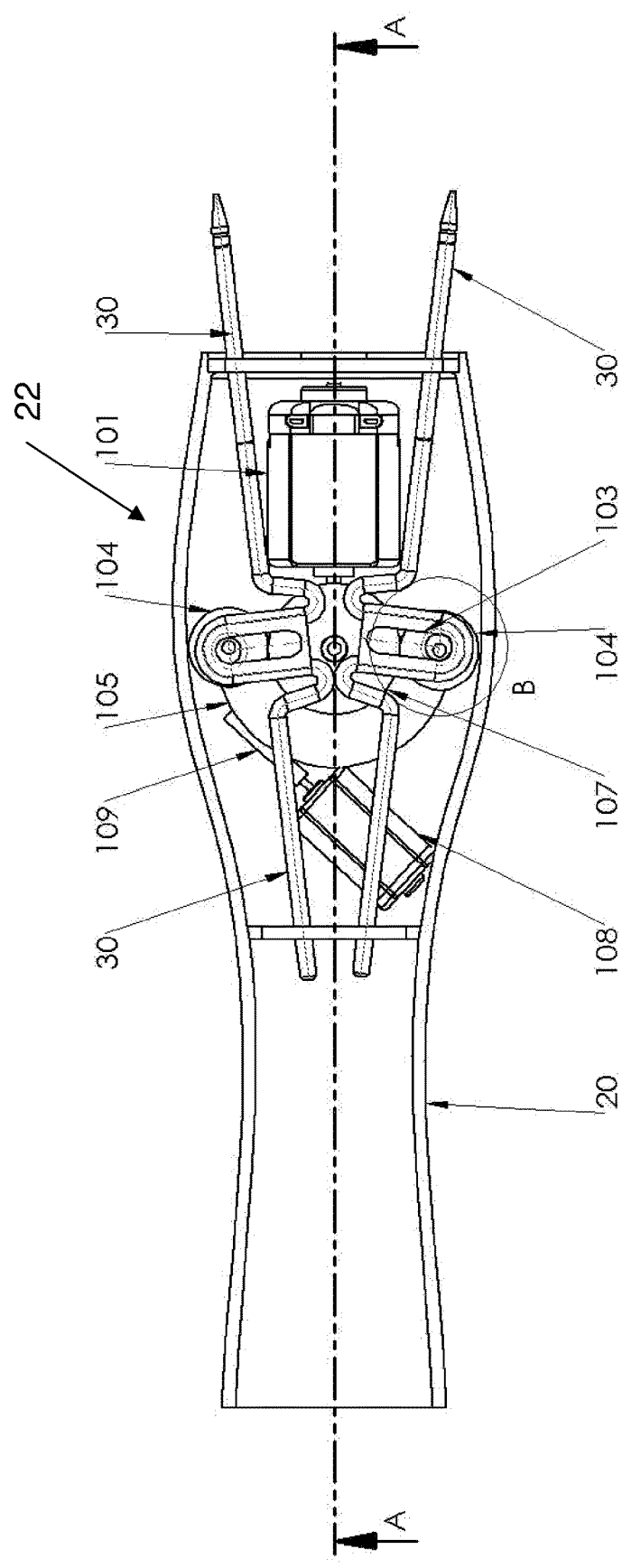
FIG. 8a is a plan view of an exemplary mechanism for the actuation mechanism of FIG. 7.

One non-limiting exemplary implementation of actuator mechanism 22 is illustrated in detail in FIGS. 8a-8c, employing two rotary motors: a first motor 108 responsible for the low-frequency to-and-fro motion and another motor 101 generating the high-frequency oscillation. The high-frequency motor 101 has an output shaft 102 with a gear that is connected through a gear transmission to a rotor 106 which is rigidly attached to a gear plate 107. Gear plate 107 is engaged with two gear wheels with two integrated cams 104. The axes of two gear wheels 104 rotate relative to worm gear plate 105. The low-frequency motor 108 drives a worm gear output 109 to rotate alternately in opposite directions. The worm gear engages gear plate 105, causing it to rotate in alternate directions at low frequency.

The two followers 103 of the two cams 104 are rigidly attached to the two shafts 30 which are bent accordingly in order to accommodate them. The eccentricities of the two cams are in opposite directions. The movement of the cams 104 is transmitted onto the followers 103 and causes the shafts 30 to move back and forth at high frequency. The axes if of rotation of the cams 104 attached to worm plate 105 move around the main axis of rotation of 105 back and forth along a circular arc, and this motion through the cams 104 and followers 103 causes the shafts 30 to move back and forth at low frequency. Additional components typically include an electronic controller with dedicated hardware or suitable programmed processing components which controls power to the motors and synchronizes their operation, for example, adjusting the stroke length of the to-and-fro motion by changing the actuation time of motor 108 in each direction. The handset typically also includes a control panel with at least an on-off switch, and optionally an adjustment control for the amplitude and/or speed of the to-and-fro motion and/or the intensity/speed of the rapid oscillatory motion. The various electronic components are omitted here for clarity of presentation of the mechanism.

As a result of this mechanism, rods 30 undergo superimposed low-frequency and high-frequency motions, as described above. As already mentioned, the low-frequency and high-frequency motions need not be driven specifically by electrical motors, and may instead be driven using a pneumatic or hydraulic source. The low-frequency motion may also be driven by a manual input possibly with an adequate transmission. Other exemplary but non-limiting examples of suitable mechanisms for displacing rods 30 are linear actuators, which may be linear electric motors as taught for example in US Patent Application 20010004171, or may include ball-screws which transform rotary motion of an electro-magnetic engine into a linear motion. Ball-screw actuators are taught for example in U.S. Pat. Nos. 8,020,464 and 8,272,284.

The handset may be held by the user in his hand or may be temporarily or permanently attached to a stand or a wall according to the user's convenience. Such arrangement be is particularly convenient for pneumatic, hydraulic or electrical power supply to the unit for driving the low-frequency or high frequency motions.

The device as described can clean either top (maxillary arch) or bottom (mandibular arch) teeth. As the upper and lower dental arch may be of different lengths, the stroke of shafts driving the mouthpiece might be different in both cases and possibly adapted by manual selection or automatically based on the measurement of a gravity-sensing element implemented in the handset.

Figure 2A:
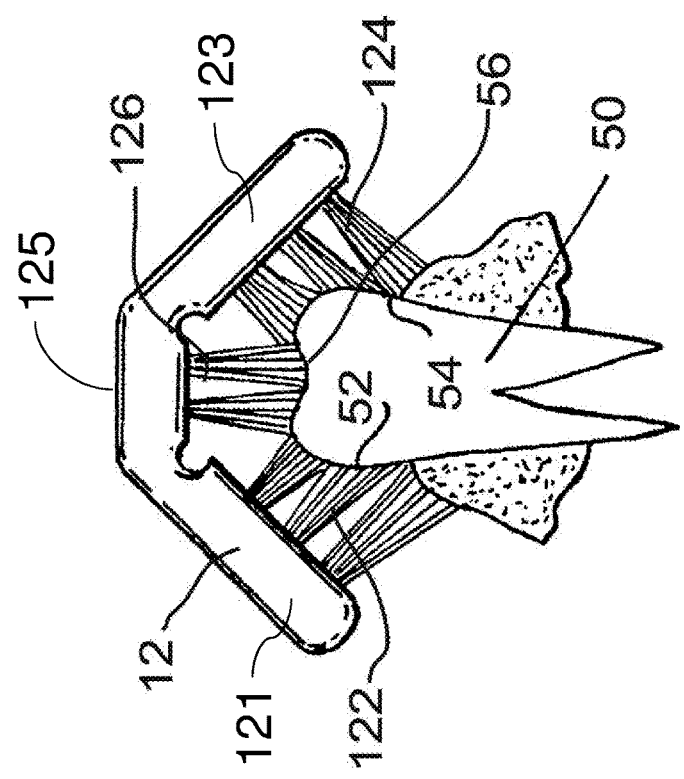
FIGS. 2a and 2b are schematic cross-sectional views taken through a brush assembly from the device of FIG. 1 in a plane perpendicular to a direction of extension of the dental arch, for an incisor and a molar respectively, illustrating the orientations of a plurality of bristles contacting various surfaces of a tooth according to an embodiment of the present invention.
Figure 2B:
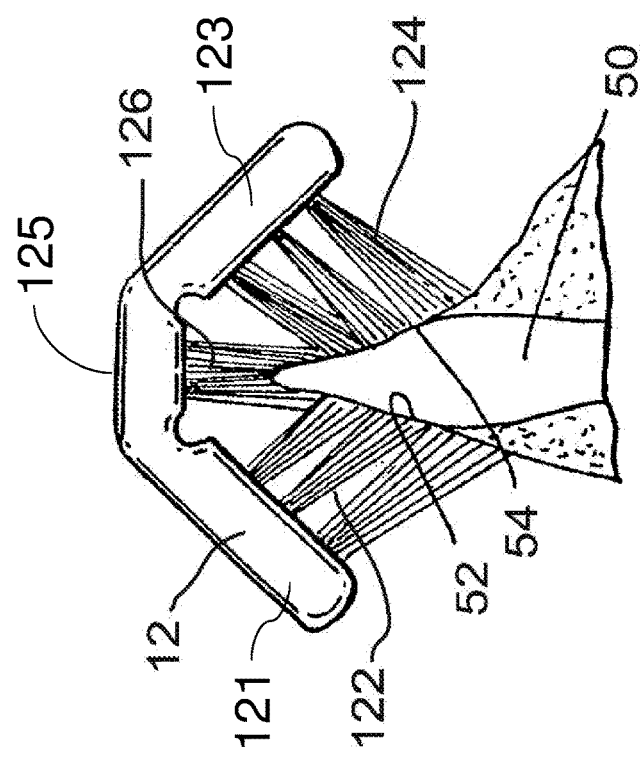

Turning now to the structure of brush assembly 16, each bristle arrangement 12 is typically formed from a plurality of bristles 122, 124, 126 projecting from at least one bristle support element, shown in FIGS. 2a and 2b as a base 125 with two inclined flaps 121 and 123. Flaps 121 and 123 may be in facing relation, or may be partially or fully offset relative to each other, effectively appearing as staggered bristle support elements on opposite sides of a central backbone of the device, and optionally with some flexibility between them, as exemplified particularly in the anterior region of FIGS. 3a and 4. Such offset adjacent bristle support elements together with whatever structure bridges between them are considered a "bristle arrangement 12" for the purpose of this document. In some cases, bristles projecting from flaps 121 and 123 may be sufficient to give brushing coverage also for the occlusal surfaces of the teeth. In other cases, bristles may also be provided on base 125, particularly in the region of the brush assembly which contacts the molars.

It should be noted that the term "bristles" is used herein to refer to any and all filaments suitable for use to form a toothbrush, whether of naturally occurring origin or artificial fibers.

Figure 3A:
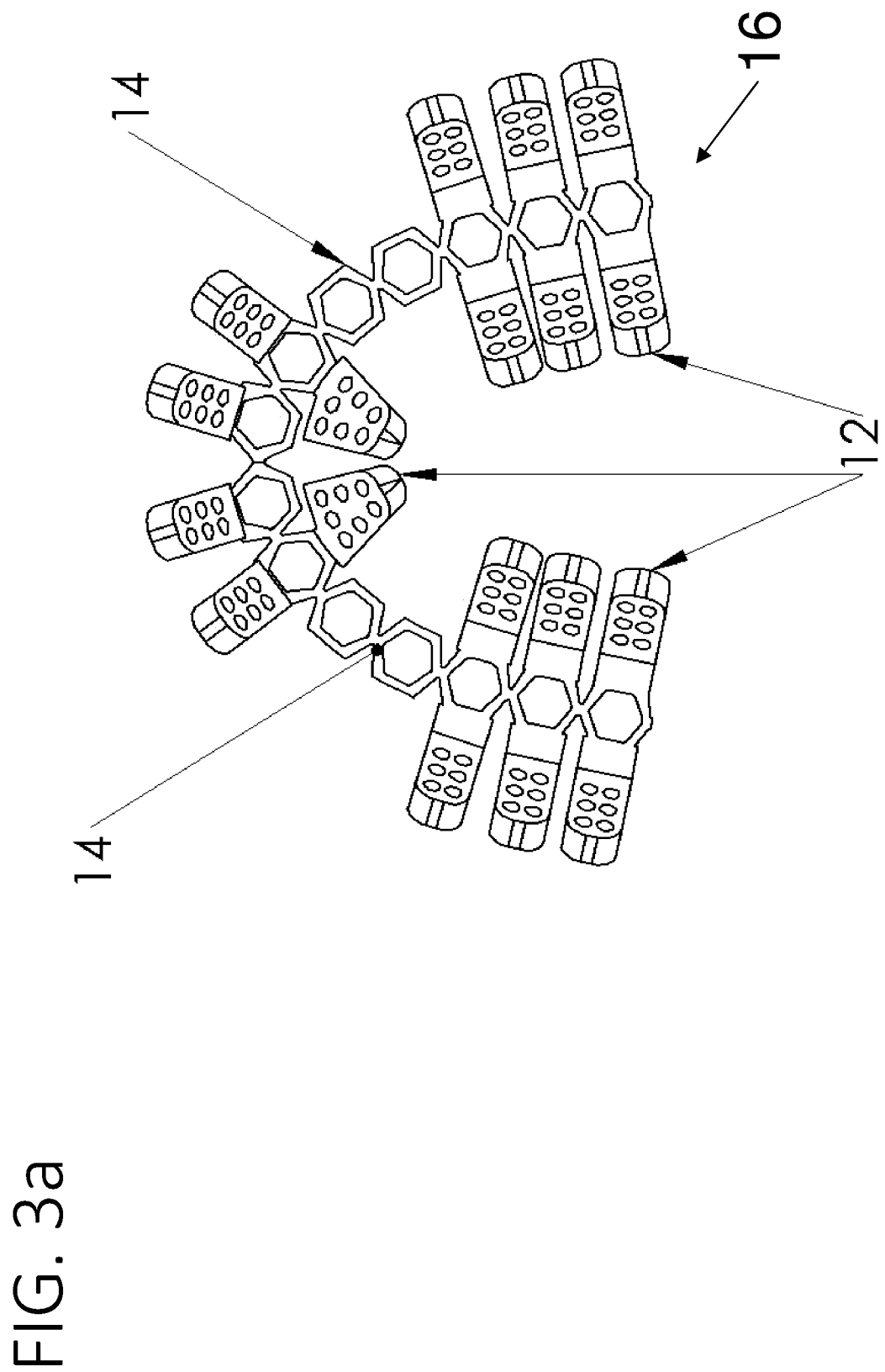
FIGS. 3a and 3b are schematic top and isometric views, respectively, of a toothbrush from the device of FIG. 1, illustrated without the bristles for clarity.
Figure 3B:
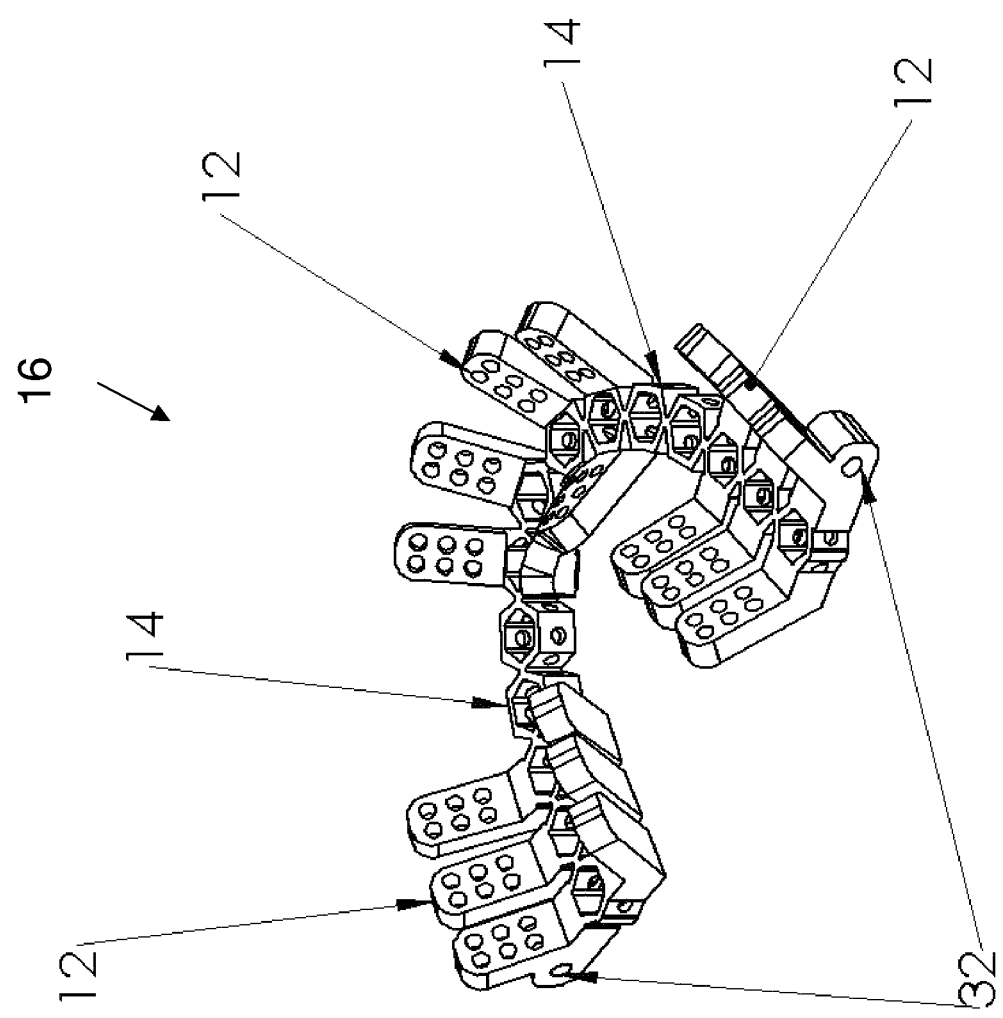
Figure 4:
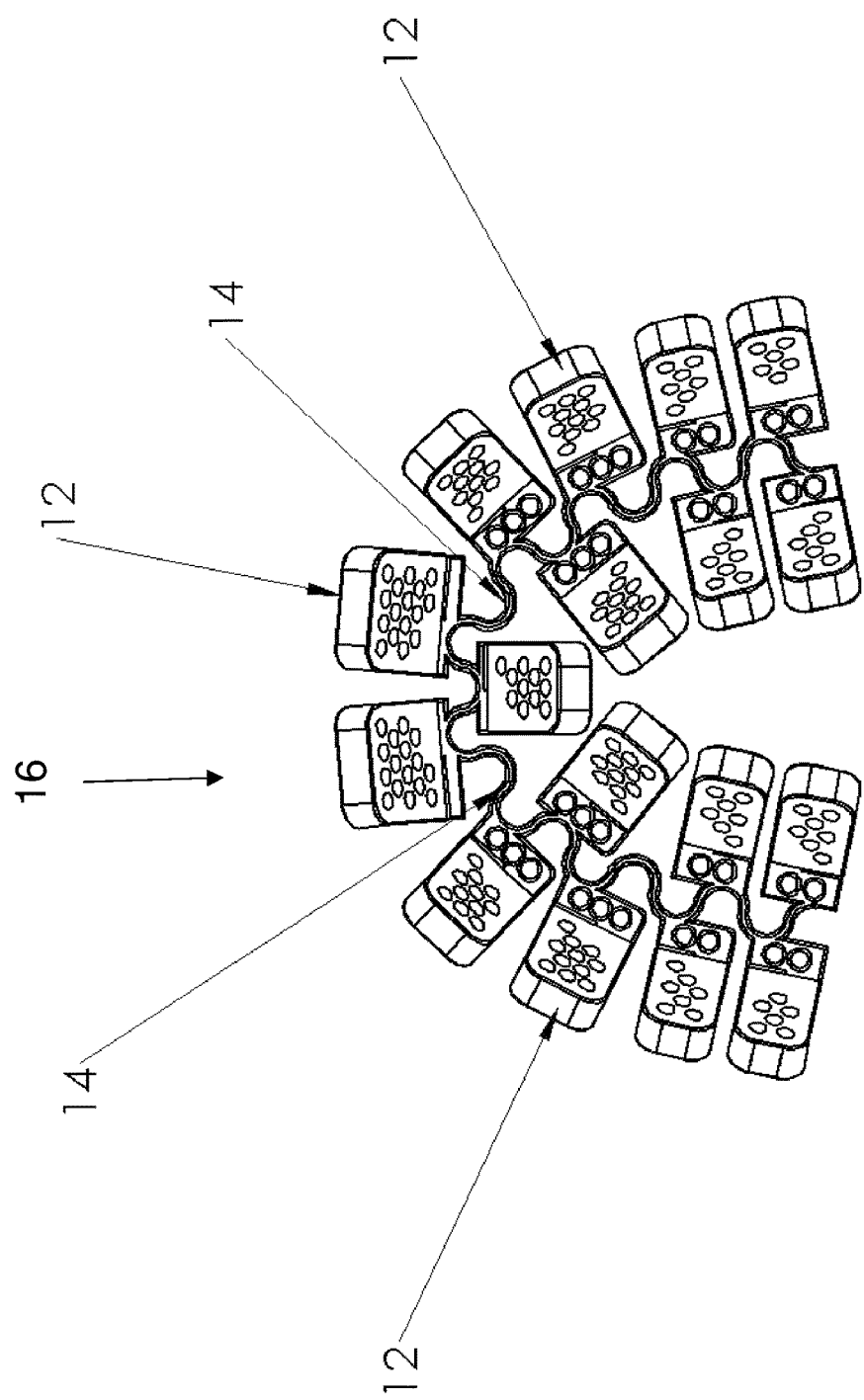
FIG. 4 is a schematic top view similar to FIG. 3a showing a variant implementation of flexible linkages interconnecting between brush assemblies of the present invention.

In certain particularly preferred implementations of the present invention, the bristle support elements and flexible linkages 14 are integrally formed from a flexible polymer material, such as for example by injection molding. Many flexible polymer materials have mechanical properties suitable for such an implementation, where a relatively wide region of the structure, such as the flaps serving as bristle support elements, are relatively inflexible under conditions of normal usage, whereas a thin-walled cellular structure such as that of FIGS. 3a-3b, or a thin-walled undulating structure such as in FIG. 4, provides considerable flexibility in a well-defined direction. In the embodiment of FIGS. 3a and 3b, the flexibility is provided by effective hinges formed at the vertices of the adjacent cells, whereas in the embodiment of FIG. 4, the undulating form provides enhanced leaf-spring flexibility. In both cases, the flexible linkages are effective to transfer sufficient compressive or tension forces along the length of the brush assembly to achieve the driving motion of the brush assembly along the arch of teeth. Alternatively, different materials may be used to provide the bristle support elements and the flexible linkages, for example, with the bristle support elements formed of a relatively stiff material while the flexible linkages are formed of a relatively more flexible material, such as for example silicone. The flexible linkages may be implemented as a continuous central structure extending along the length of the brush assembly curved form, serving as a backbone for the brush assembly, while the bristle arrangements are arranged bilaterally projecting from the flexible backbone, in opposing pairs or in partially or fully staggered relation. Where two different materials are used, they may advantageously be combined by use of overmolding techniques, which are already commonly in use in the field of toothbrushes. Tufts of bristles are typically incorporated during the molding process, also using techniques that are standard in the field of toothbrush manufacture. The proportion of the length of brush assembly that is provided with bristles may be chosen according to various considerations, balancing user comfort and power requirements against efficacy of the brushing action. In certain particularly preferred implementations, a plurality of bristle arrangements 12 are deployed such that bristles contact the teeth along a contact profile spanning a majority of a length of the brush assembly.

Although illustrated thus far in the context of a toothbrush for brushing one arch of teeth at a time, certain implementations of the present invention provide for simultaneous brushing of both the upper and lower arches of teeth. Thus, in certain cases, bristle arrangements 12 include bristles deployed for simultaneously contacting facial and lingual surfaces of the teeth of both a maxillary arch and a mandibular arch. Most preferably, a system for simultaneous brushing of upper and lower teeth is implemented with two independent monorail train brush arrangements, one for the upper dental arch and the other one for the lower dental arch. Each such train is driven by a separate pair of shafts driven by the handset. In a preferable implementation, the two trains move in opposite directions, thereby avoiding simultaneous double-thickness overlap of the two brush assemblies in the rear molar region, where clearance between the teeth is smallest for a given degree of opening of the jaw.

In use, toothbrush 10 is positioned with brush assembly 16 on an arch of teeth of the user so that bristles of the bristle arrangements 12 contact facial and lingual surfaces of the teeth. The brush assembly 16 is displaced, preferably by actuating the actuation mechanism 22, so that each of said bristle arrangements rides along a corresponding portion of the arch of teeth. The motion preferably includes a rapid oscillatory motion of the brush assembly superimposed on a to-and-fro displacement.

It will be appreciated that the above descriptions are intended only to serve as examples, and that many other embodiments are possible within the scope of the present invention as defined in the appended claims.

What is claimed is:

1. A toothbrush for brushing at least one arch of teeth in a mouth of a user, the toothbrush comprising:
   a brush assembly for introducing into the mouth of the user, the brush assembly comprising:
   (a) at least three bristle arrangements, each of said bristle arrangements including a plurality of opposing inwardly-directed bristles for simultaneously contacting facial and lingual surfaces of the teeth; and
   (b) flexible linkages interconnecting said at least three bristle arrangements, said flexible linkages being configured to maintain a relative spacing between said bristle arrangements while allowing variation of an effective curvature of the brush assembly such that said at least three bristle arrangements can ride along, and conform to a non-uniform curvature of, the arch of teeth, and
   a pair of rods attached to two contralateral regions of said brush assembly such that displacement of said pair of rods causes an entire part of the toothbrush that is inside the mouth to travel along the arch of teeth using the teeth as a monorail which defines a local curvature of the brush assembly.

2. The toothbrush of claim 1, further comprising an actuation mechanism mechanically linked to said brush assembly via said pair of rods and configured to displace said brush assembly in a to-and-fro motion along the arch of teeth.

3. The toothbrush of claim 2, wherein said actuation mechanism is configured to displace said brush assembly in a compound motion comprising the to-and-fro motion with a first amplitude and a first frequency and an oscillatory component with a second amplitude smaller than said first amplitude and a second frequency higher than said first frequency.

4. The toothbrush of claim 3, wherein said second frequency of said oscillatory motion is at least an order of magnitude higher than said first frequency of said to-and-fro motion.

5. The toothbrush of claim 2, wherein said brush assembly includes at least one gap between adjacent bristle arrangements, and wherein an amplitude of said to-and-fro motion is larger than a length of said at least one gap.

6. The toothbrush of claim 2, wherein said actuation mechanism is configured to remain outside the mouth of the user, said actuation mechanism being configured to impart motion to said brush assembly via said rods.

7. The toothbrush of claim 2, wherein said actuation mechanism comprises an electric actuator.

8. The toothbrush of claim 2, wherein said actuation mechanism comprises a pneumatic actuator.

9. The toothbrush of claim 2, wherein said actuation mechanism comprises a hydraulic actuator.

10. The toothbrush of claim 1, wherein each of said bristle arrangements comprise a plurality of bristles projecting from at least one bristle support element, and wherein said bristle support elements and said flexible linkages are integrally formed from a flexible polymer material.

11. The toothbrush of claim 1, wherein at least one of said bristle arrangements further includes bristles inwardly directed for contacting occlusal surfaces of the teeth.

12. The toothbrush of claim 1, wherein said brush assembly has a length sized to extend along a majority of a length of the arch of teeth.

13. The toothbrush of claim 12, wherein said at least three bristle arrangements are implemented as a plurality of bristle arrangements deployed such that bristles contact the teeth along a contact profile spanning a majority of a length of said brush assembly.

14. The toothbrush of claim 1, wherein said bristle arrangements include bristles deployed for simultaneously contacting facial and lingual surfaces of the teeth of both a maxillary arch and a mandibular arch.

15. A method for brushing at least one arch of teeth in a mouth of a user, the method comprising the steps of:
  (a) positioning the toothbrush of claim 1 on the arch of teeth so that bristles of each of the bristle arrangements contact facial and lingual surfaces of the teeth; and
  (b) displacing the toothbrush so that each of said bristle arrangements rides along a corresponding portion of the arch of teeth.

16. The method of claim 15, further comprising generating a rapid oscillatory motion of the toothbrush during said displacing.

17. An automatic toothbrush for brushing at least one arch of teeth in a mouth of a user, the automatic toothbrush comprising:
  (a) a brush assembly for introducing into the mouth of the user, the brush assembly comprising:
    (i) at least three bristle arrangements, each of said bristle arrangements including a plurality of opposing inwardly-directed bristles for simultaneously contacting facial and lingual surfaces of the teeth, and
    (ii) flexible linkages interconnecting said at least three bristle arrangements, said flexible linkages being configured to maintain a relative spacing between said bristle arrangements while allowing variation of an effective curvature of the brush assembly such that said at least three bristle arrangements can ride along, and conform to a non-uniform curvature of, the arch of teeth; and
  (b) an actuation mechanism mechanically linked to said brush assembly and configured to displace an entire part of the toothbrush that is inside the mouth in a compound motion comprising a first component performing a to-and-fro motion along the arch of teeth with a first amplitude and a first frequency and a second component performing an oscillatory motion with a second amplitude smaller than said first amplitude and a second frequency higher than said first frequency.

\* \* \* \* \*